Nov. 17, 1925.
E. M. PERRY
1,561,996
ENDLESS RUNNER FOR MOTOR TRUCKS
Filed March 2, 1920    11 Sheets-Sheet 2
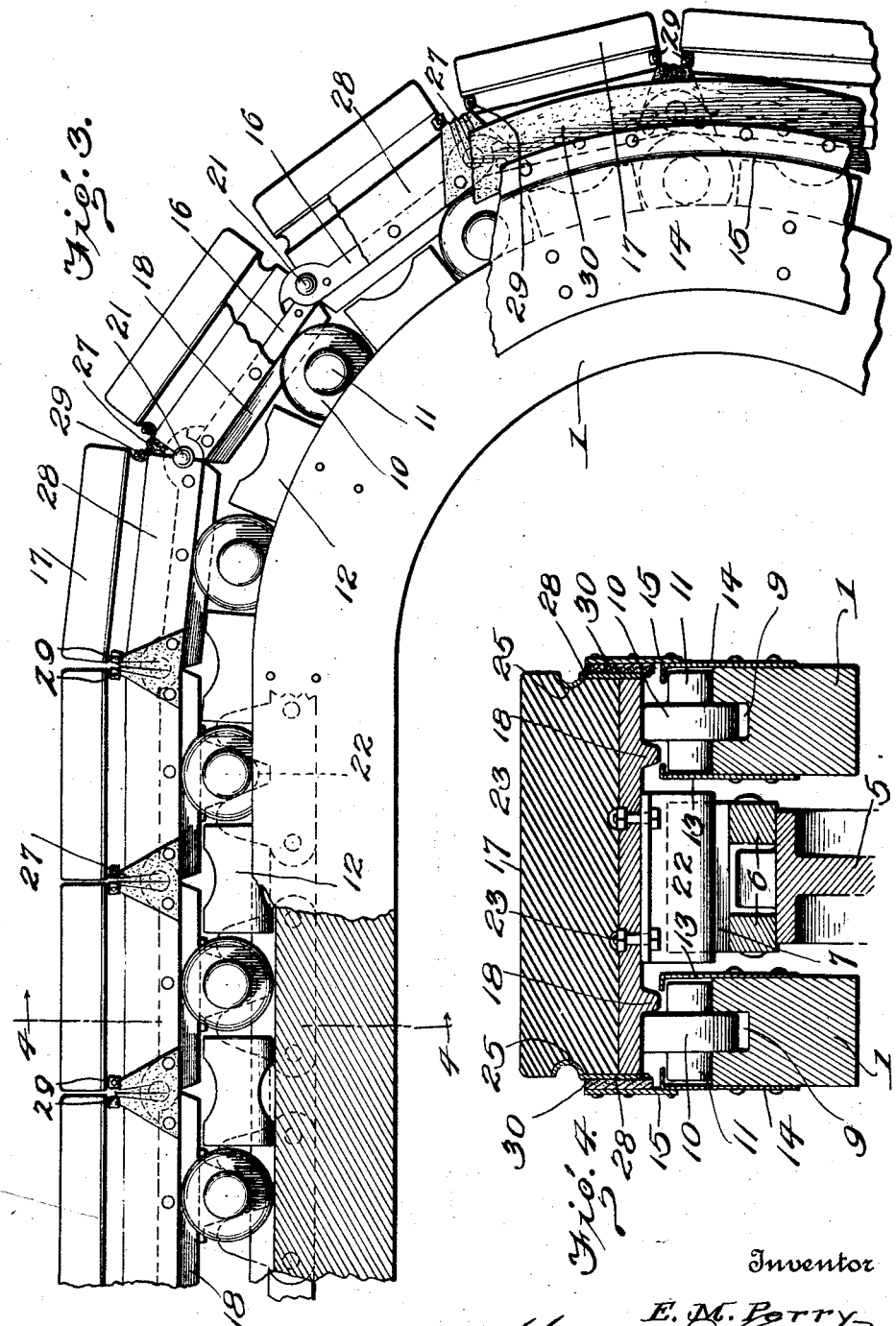
Inventor
E. M. Perry
By Munn & Co.
Attorney

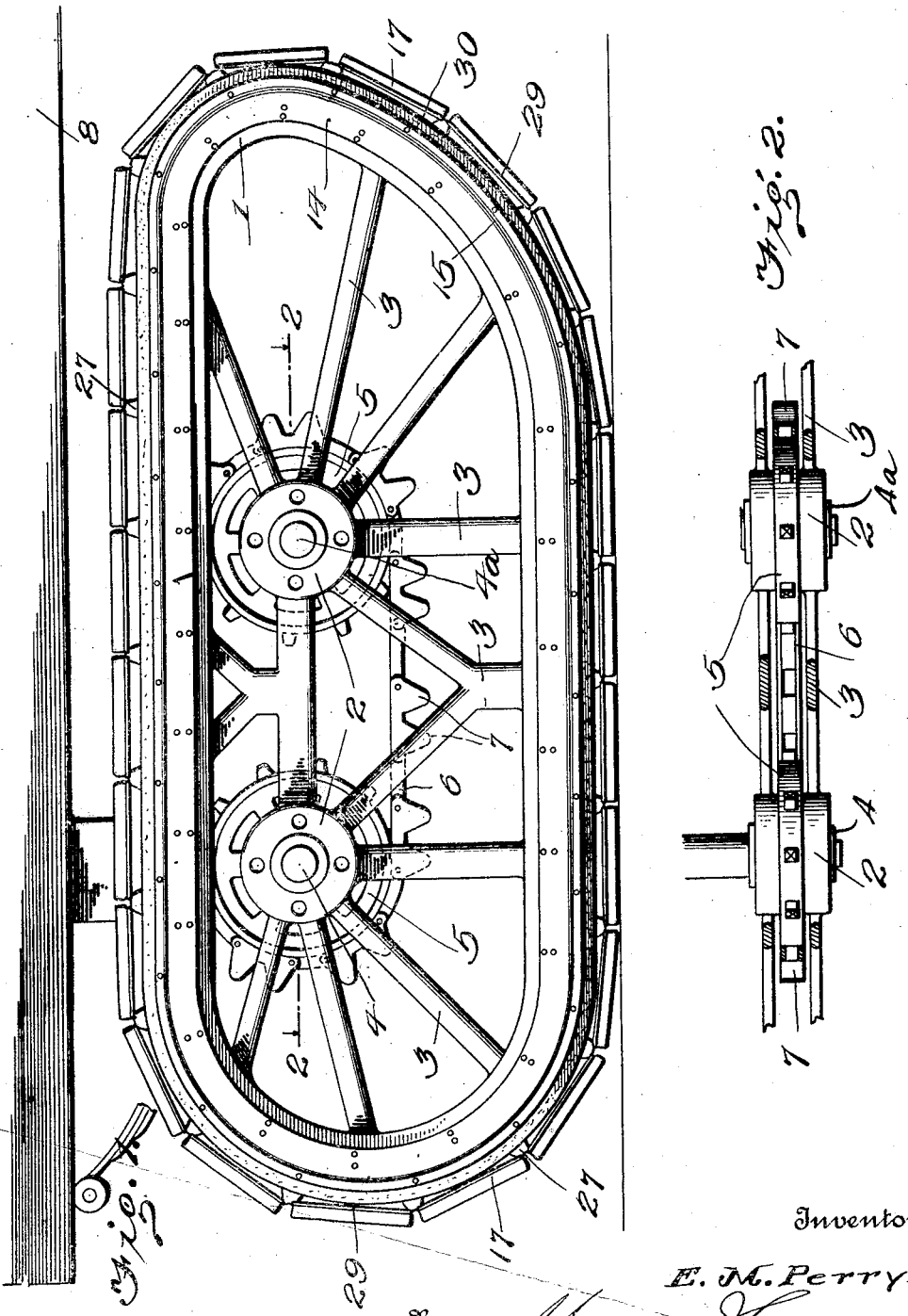

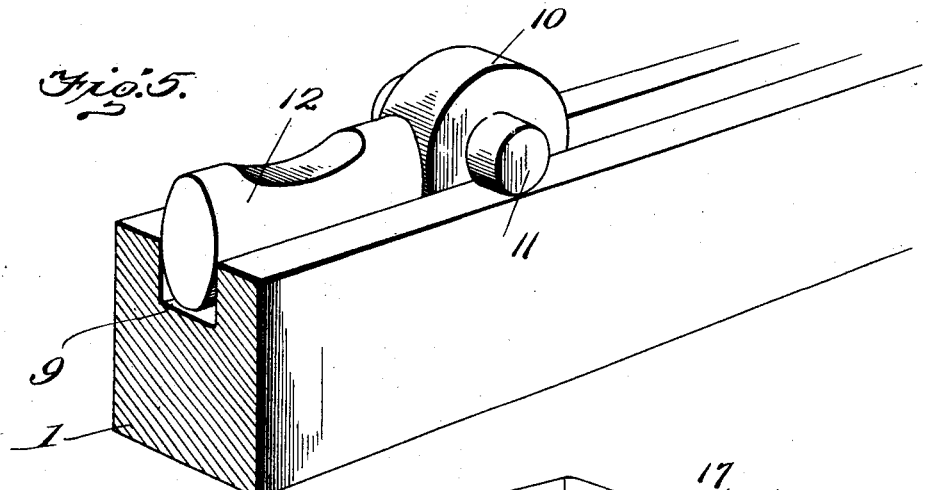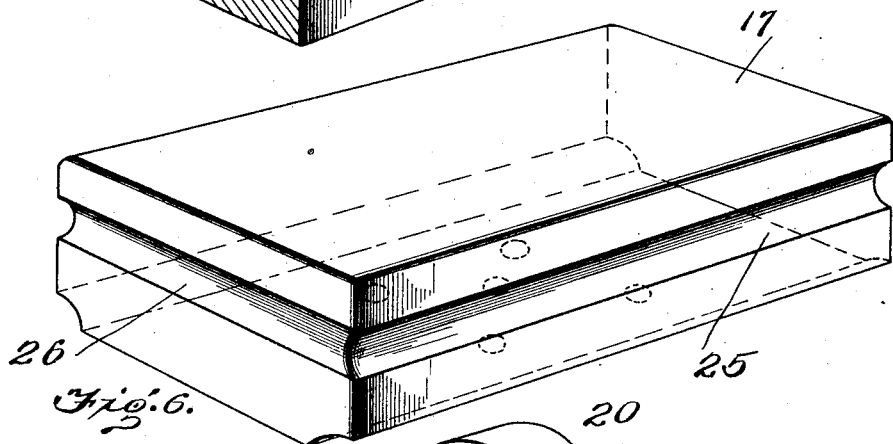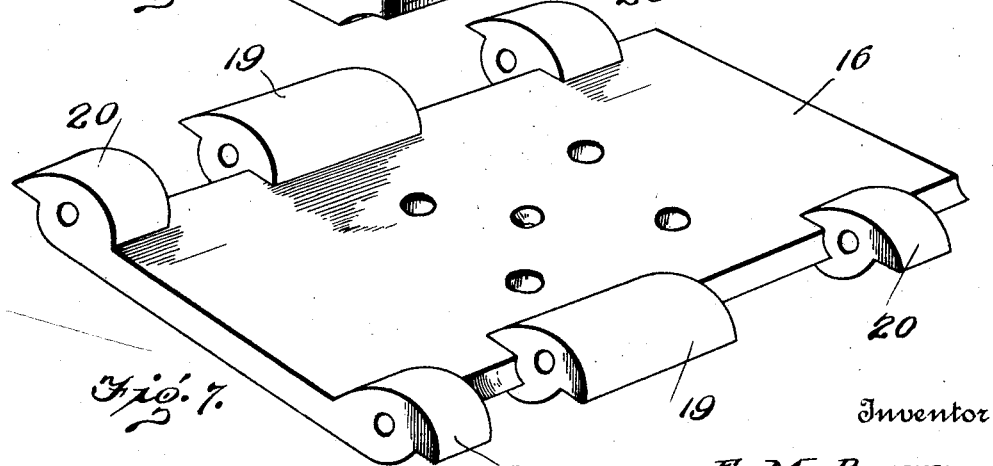

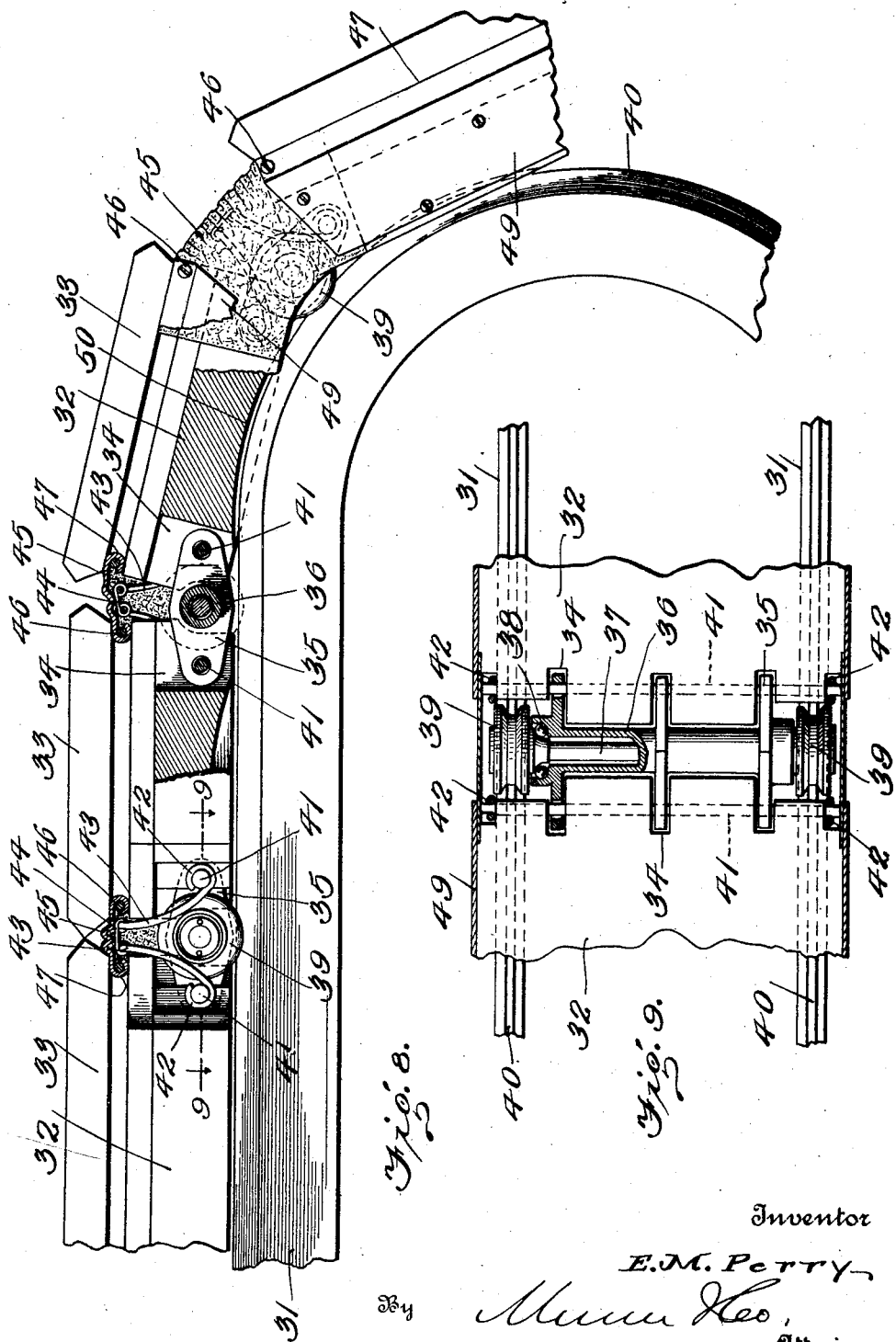

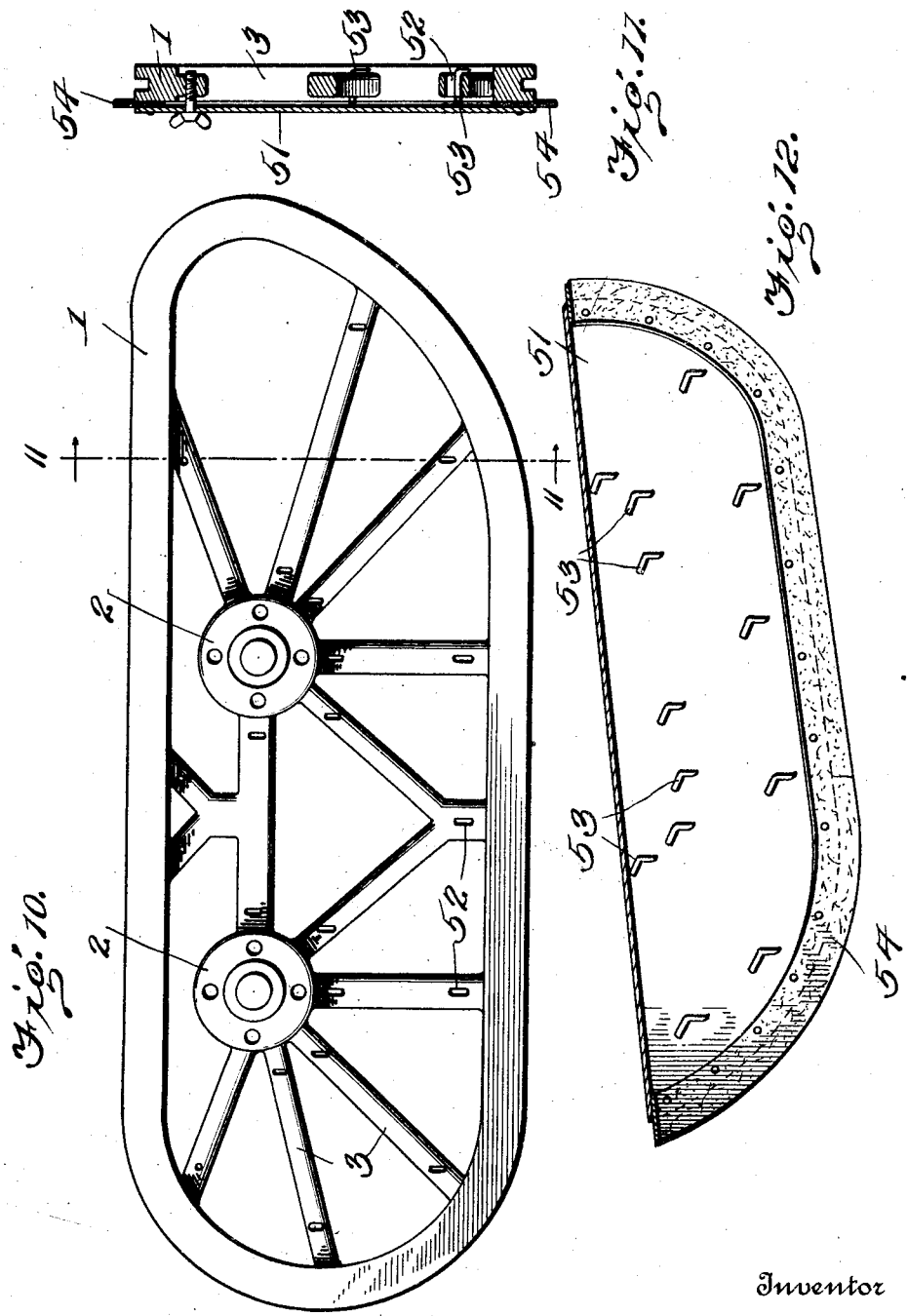

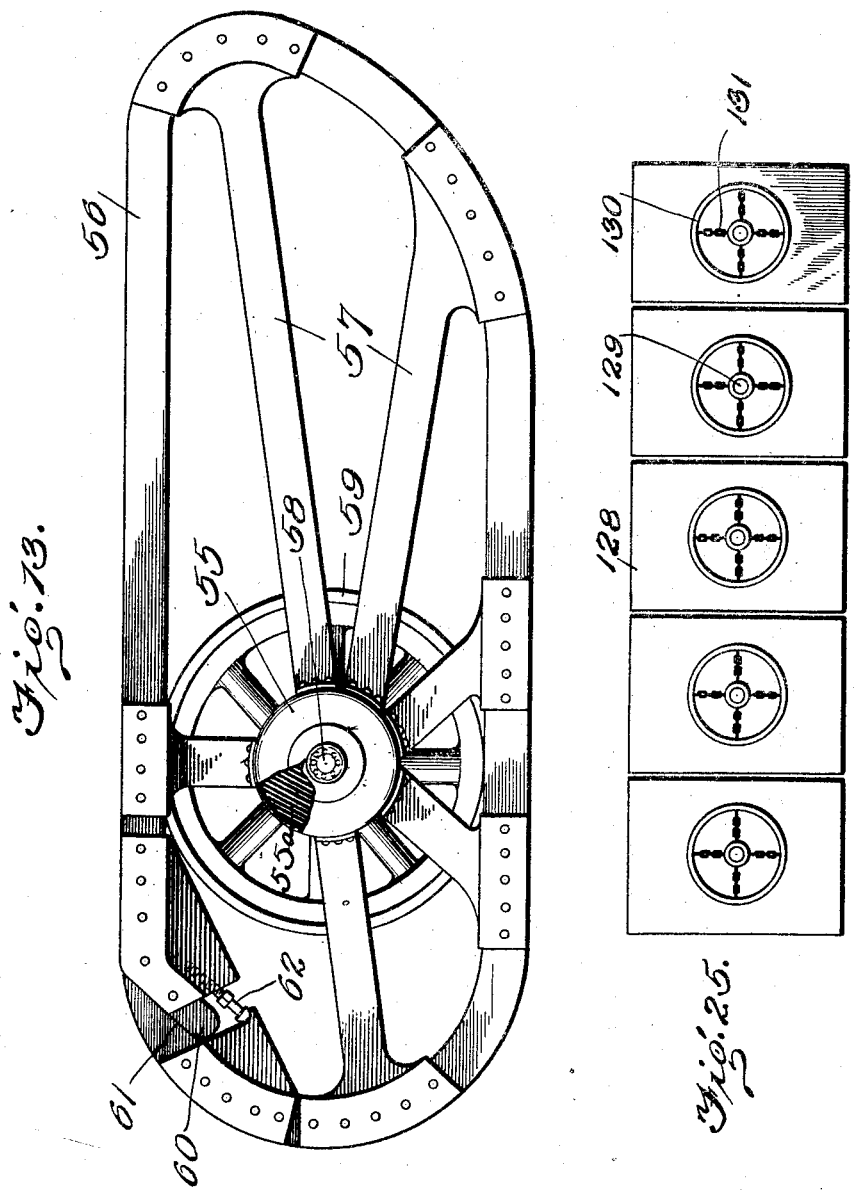

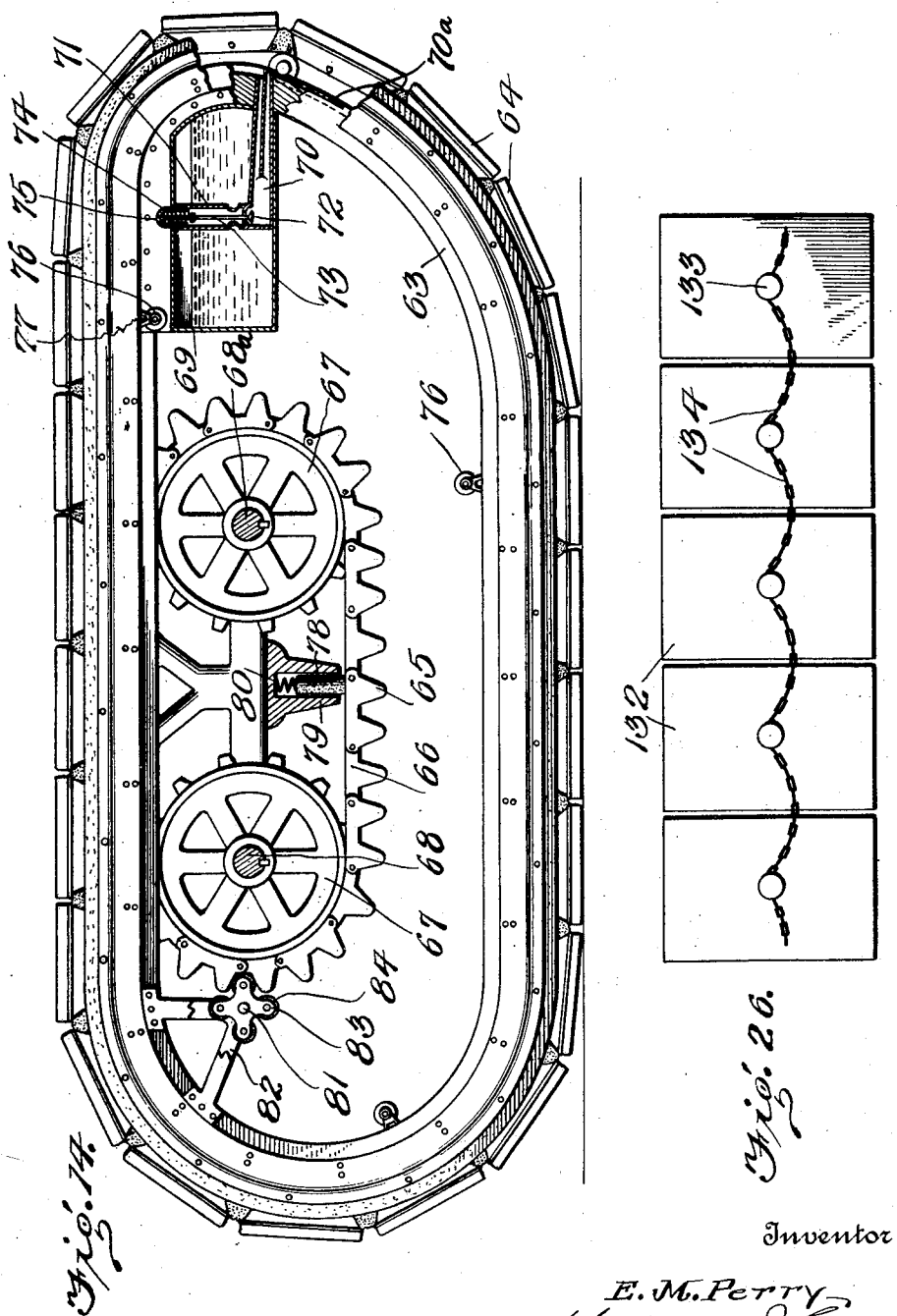

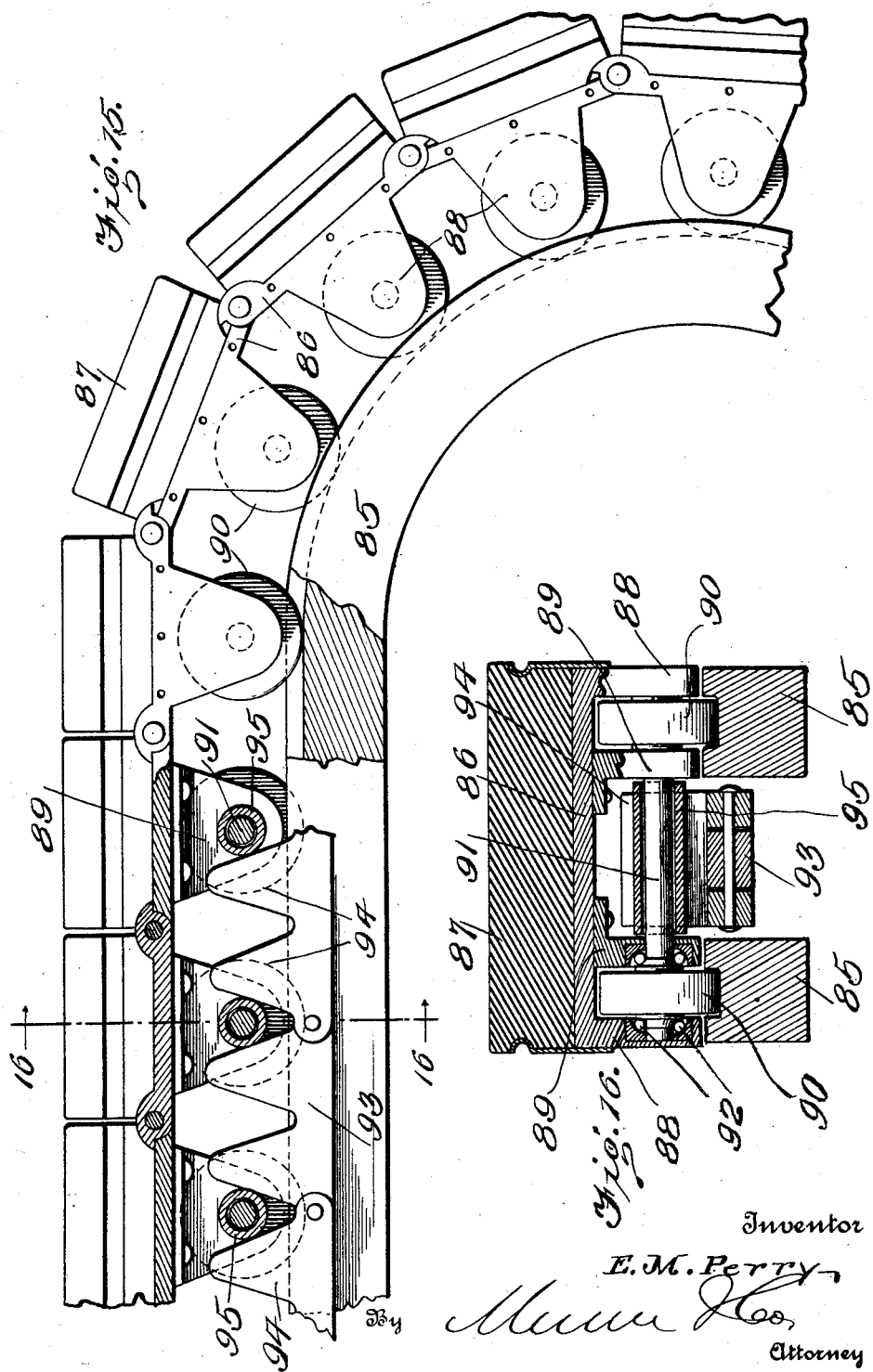

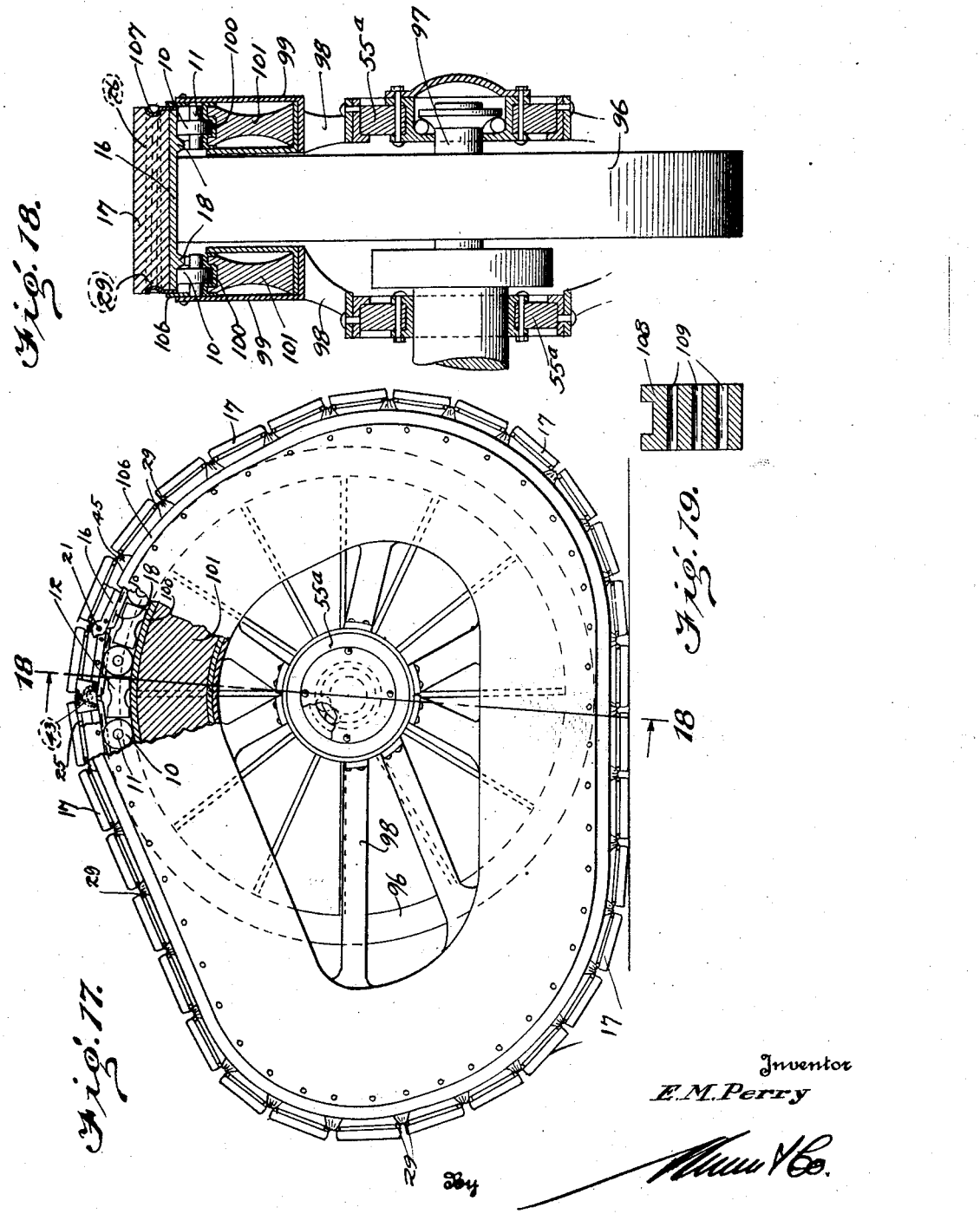

Nov. 17, 1925.
E. M. PERRY
1,561,996
ENDLESS RUNNER FOR MOTOR TRUCKS
Filed March 2, 1920     11 Sheets-Sheet 10
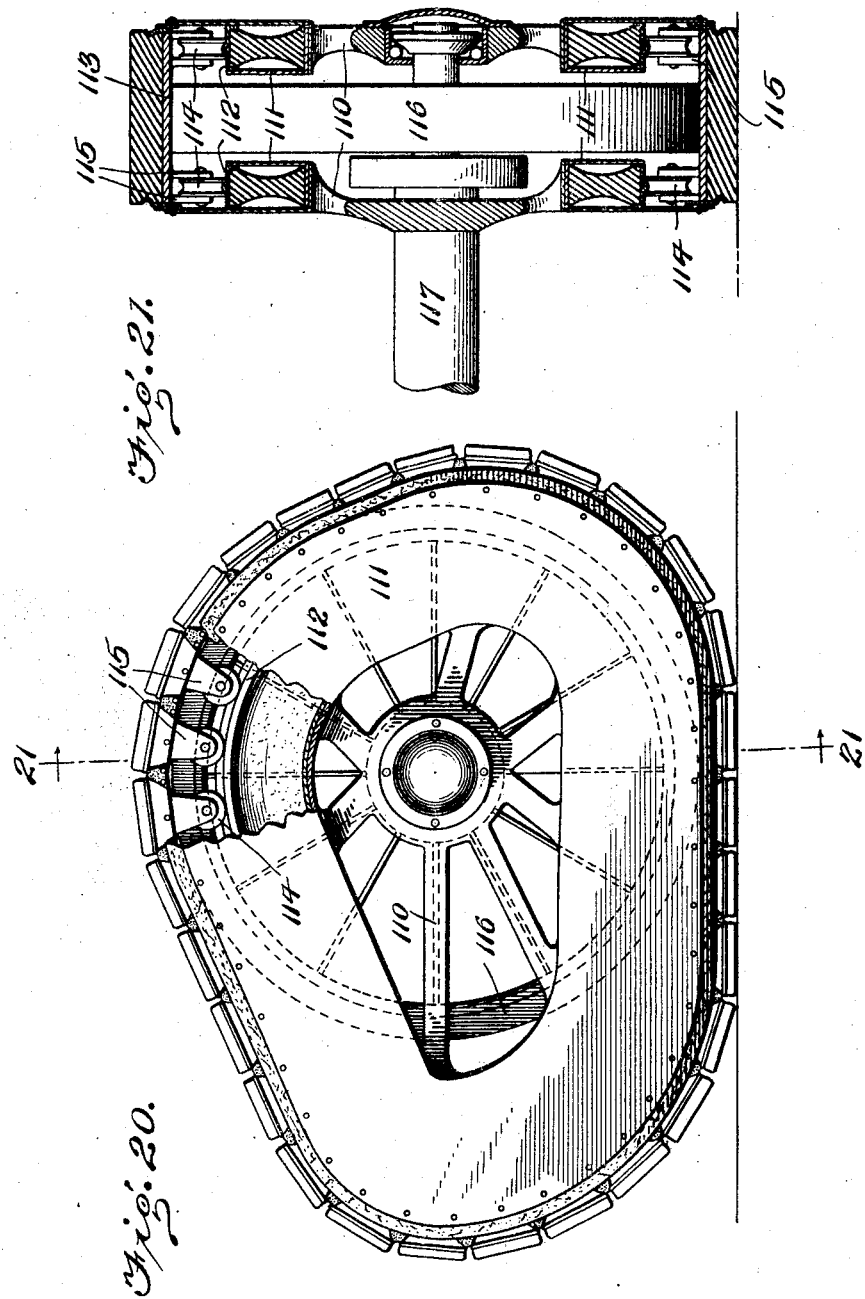
Inventor
E. M. Perry
By
Attorney Nov. 17, 1925.
E. M. PERRY
ENDLESS RUNNER FOR MOTOR TRUCKS
Filed March 2, 1920    11 Sheets-Sheet 11
1,561,996
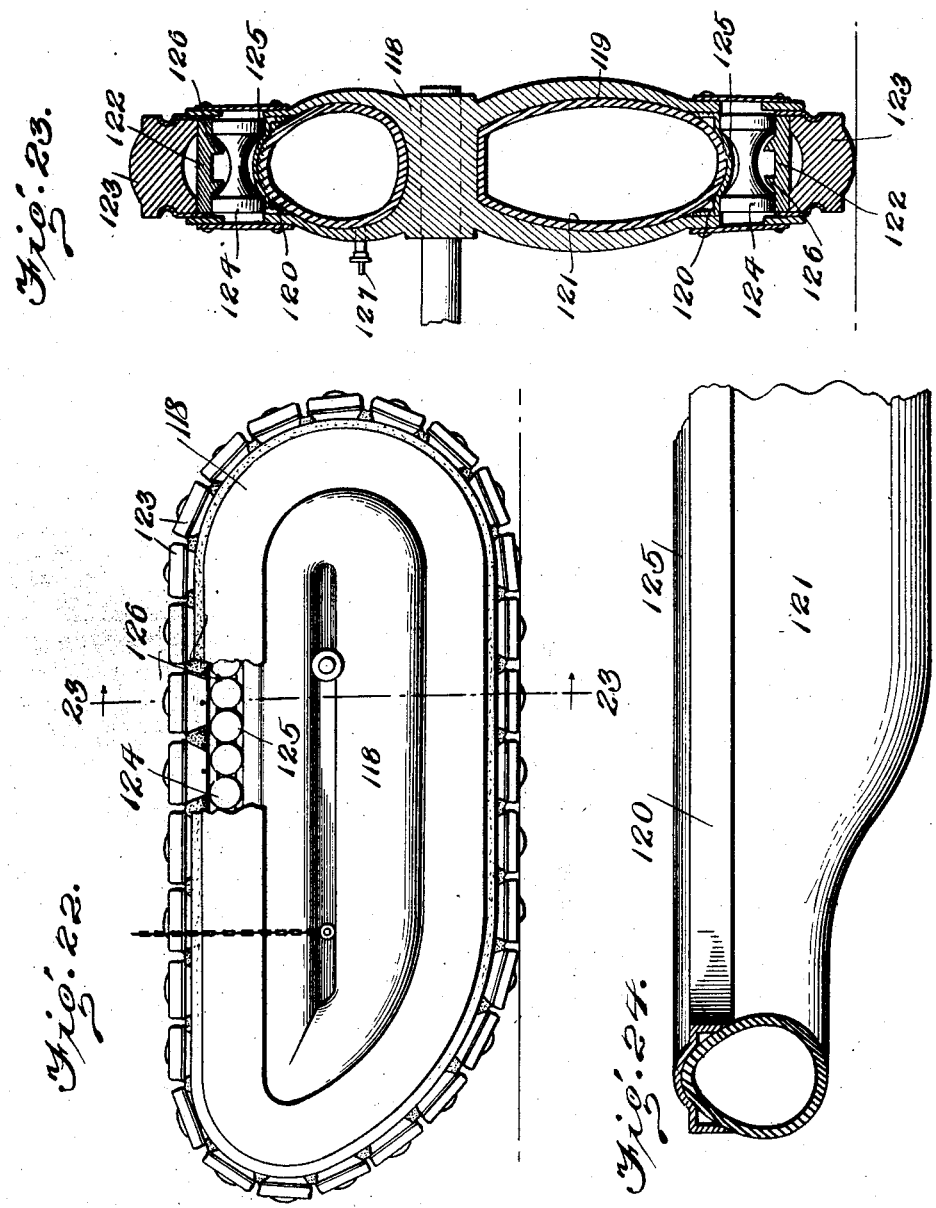
Inventor
E. M. Perry
By
Attorneys Patented Nov. 17, 1925.

1,561,996

UNITED STATES PATENT OFFICE.

ELDIN M. PERRY, OF WASHINGTON, DISTRICT OF COLUMBIA.

ENDLESS RUNNER FOR MOTOR TRUCKS.

Application filed March 2, 1920. Serial No. 362,641.

*To all whom it may concern:*

Be it known that I, ELDIN M. PERRY, a citizen of the United States, and a resident of Washington, in the District of Columbia, have invented certain new and useful Improvements in Endless Runners for Motor Trucks, of which the following is a specification.

My invention is an improvement in tractors of the endless runners type, and has for its object to provide a device of the character specified adapted for use with motor cars of every character, wherein a new and improved form of runner is provided, and a new and improved support therefor.

In the drawings:

Figure 1 is a side view of one of the improved runners, and its supporting mechanism;

Figure 2 is a section on the line 2—2 of Figure 1;

Figure 3 is a partial side view of the runner and its trackway, with parts removed and parts in section;

Figure 4 is a section on the line 4—4 of Figure 3;

Figure 5 is a perspective view of a portion of the track, with one of the rollers and the spacer;

Figure 6 is a perspective view of one of the tread blocks;

Figure 7 is a similar view of one of the tread plates;

Figure 8 is a partial section through a modified form of runner;

Figure 9 is a section on the line 9—9 of Figure 8;

Figure 10 is a side view of the track and its supporting frame;

Figure 11 is a section on the line 11—11 of Figure 10;

Figure 12 is a perspective view of one of the covers looking from the inner side;

Figure 13 is a side view of a modified construction of track and frame;

Figure 14 is a side view, with parts in section, showing a method of lubricating;

Figure 15 is a partial side view of another embodiment of the invention, with parts in section;

Figure 16 is a section on the line 16—16 of Figure 15;

Figure 17 is a side view, with parts broken away, of another embodiment of the invention;

Figure 18 is a section on the line 18—18 of Figure 17;

Figure 19 is a transverse section of the cushioning construction;

Figure 20 is a view similar to Figure 17, showing another embodiment of the invention;

Figure 21 is a section on the line 21—21 of Figure 20;

Figure 22 is a view similar to Figure 19 of another embodiment of the invention;

Figure 23 is a section on the line 23—23 of Figure 22;

Figure 24 is a partial perspective view of the pneumatic shoe;

Figure 25 is a plan view of the tread block, showing a form of tread or anti-skid chain;

Figure 26 is a similar view showing another form of chain.

In the embodiment of the invention shown in Figures 1 to 7, inclusive, the trackway consists of similar sections or what may be termed rails 1, each of which is a continuous oblong or substantially elliptical structure, and these sections are connected to hubs 2 by means of spokes or frame members 3, to suitably connect the tracks or rails to the hubs and to brace hubs and track section against each other.

Shafts 4 and 4ª are journaled in the hubs, the shaft 4 being the axle of the truck or car, and held in the usual housing and driven in the usual manner, the housing being connected to the truck frame in the usual manner, and sprocket wheels 5 are secured to the shafts 4 and 4ª between the track sections. These wheels are connected by a chain 6 which is provided with outwardly facing teeth 7 which engage with the endless runner mounted upon the trucks, to drive the said runner. It will be understood that a runner is arranged at each side of the rear of the vehicle 8 and that the motive power of the vehicle is applied to the shaft or axle 4.

Referring to Figure 4, it will be noticed that the outer faces or peripheral surfaces of the tracks 1 are grooved, as indicated at 9, and a series of rollers 10 runs upon each track. Each of these rollers, as shown, has its ends reduced, as indicated at 11, to form journal pins, and these reduced ends run upon the peripheral face of the track at each side of the groove 9, the rollers fitting within the grooves.

Suitable spacers 12 are arranged between the adjacent rollers of each track, the spacers moving in the grooves 9 and being moved with the rollers. The rollers are prevented from leaving the tracks by means of inner and outer retainers or housings 13 and 14. Referring to Figure 4, it will be noticed that each retainer has an inwardly extending flange at its peripheral edge which engages over the adjacent journal pins. A ring 15 is secured to each retainer 14 and is extended beyond the peripheral edge of the said retainer for a purpose to be presently described.

The retainers are secured to the tracks in any suitable or desired manner, and they act as housings, to prevent the entrance of dust at the journal pins.

The improved runner is composed of a series of tread plates 16 which are hinged together at their adjacent side edges, and each tread plate carries a tread block 17 of rubber or other suitable material. Each tread plate is provided on the face adjacent to the tracks 1 with a pair of longitudinally extending ribs 18, and these ribs 18 engage inside the wheels 10, thus preventing lateral displacement of the endless runner from the wheels. The plates 16 are hinged together with a rule joint connection, so that they cannot swing at the joint inwardly beyond a position where they are in alinement, but may swing at the joint freely outwardly, as shown more particularly in Figure 3.

The hinged lugs are indicated at 19 and 20 in Figure 7, and suitable pintle pins 21 are passed through the lugs. The endless chain or runner is driven from the chain 6, teeth 22 being secured to the inner faces of the tread plates by means of bolts and nuts 23. The under faces of the tread blocks 17 are recessed to receive the ends of the bolts. A tooth is secured to each tread plate at the center thereof, and, referring to Figure 1, it will be noticed that the teeth 7 are secured to the chain 6 in sets of two. Thus the teeth 22 engage between the sets of two on the chain.

Referring to Figure 6, it will be noticed that the tread blocks have grooves 25 and 26 in their side and end faces, the said grooves 25 being continuous with the grooves 26, and by means of these grooves housing covers 27 of flexible material, as, for instance, cloth or leather, are connected with the blocks, to cover the joints between the blocks.

These covers or hoods 27 are secured at the bottom of the blocks by means of housing plates 28, the said plates covering the joint between the blocks 17 and the plates 16, and each plate at its upper edge has an inwardly curved portion, as shown in Figure 4, fitting within the adjacent groove 25. The hoods or covers 27 are held at their ends by cross bolts 29, whose ends pass through openings in the bottoms of the curved portions of the plates 28 which fit within the grooves 25. The clamping rings clamp the hoods or covers, and the said hoods or covers are loose enough between the clamps of the adjacent blocks to permit free movement of the blocks with respect to each other in order that they may take the position shown at the right of Figure 3. Each of the rings 15 before mentioned has secured to the inner face thereof a strip 30 of leather or like material, and the inner faces of the said strips move against the outer faces of the housing plates 28, as shown in Figure 4, to seal the space between the runner and rails.

In the embodiment of the invention shown in Figures 8 and 9, the track 31 is of usual construction, and the tread is composed of blocks 32, of wood or the like, which are faced with treads 33 of resilient material, as, for instance, rubber. Each of the blocks is notched at its ends, as indicated at 34, to receive radial arms 35 on a sleeve 36 which is mounted upon a shaft 37 and is supported from the shaft by ball bearings, indicated at 38. The shaft has grooved wheels 39 at its ends, and these wheels run on the tracks 31, the said tracks having continuous ribs 40 for engaging the grooves of the rollers. The radial arms 35 are arranged in sets, the members of the sets extending in opposite directions, and in the present instance there are three arms in each set. These arms extend into the notches 34 and are pivoted to the blocks by pivot pins 41.

Referring to Figure 9, it will be noticed that each pivot pin is engaged by eyes 42 on the ends of the rods 43. Each of these rods is curved, and it will be noticed that the two rods at each end of each shaft 37 are arranged with their concave faces away from each other. At their tops the rods have inwardly extending lugs, and these lugs are connected by a connecting plate 44. It will be noticed that the rods 41 are annularly reduced to receive the eyes 42.

The joint formed between the blocks is covered by a hood or cover 45 of flexible material, and corresponding to the hood or cover 27 of Figure 1, and this cover is held in place by screw bolts 46 which rest within the grooves 47 which encircle the facing blocks, and correspond to the grooves 25—26 of Figure 1. The hoods or covers are also held in place by housing plates 49 secured to the side faces of the blocks 32 by means of screws, as shown, or in any other suitable or desired manner.

The elements 43 and 44 form a support for the flexible covers 45 to prevent such covers from collapsing when they are not under tension.

Referring to Figure 8, it will be noticed that the blocks 32 are concave on their inner faces, as indicated at 50, to permit them to pass the rounded corners of the tracks, as shown, and the improved runner may be driven in any suitable or desired manner.

In Figures 10 to 12 is shown the supporting frame for the tractor, consisting of the hubs, the tracks and the spokes, together with the cover or housing plate 51 for covering and protecting the open supporting frame. Referring to Figure 10 it will be noticed that the spokes 3 have openings 52 at suitable points, which are adapted to be engaged by hooks or catches 53 on the covers or housing plates 51. These covers or housing plates have secured to their edges strips 54 of leather or like material, and these strips are clamped between the housing plates and the tracks 1 and spokes 3.

Referring to Figure 11, it will be noticed that the strip 54 extends beyond the housing plate, lapping well beyond the peripheral surface of the track.

In Figure 13 is shown a modified construction of frame. This frame comprises a hub 55, track sections 56, which are split sections, and are connected to the hubs by spokes 57. In this construction the spokes are preferably neither integral with the track sections nor with the hubs, being connected to both by rivets, bolts or the like, as shown.

The driving shaft or axle 58 is journaled in the hub 55, a ball bearing being arranged between the hub and the shaft, and the traction wheel 59 is secured to the axle. The improved runner (not shown) runs upon the track 56, and it will be noticed that at the split one end of each section has an inclined or angular inwardly extending portion 60, and the other end of the section is beveled, as indicated at 61, to slide thereon. An expanding screw 62 provided with a lock nut is arranged between the ends of each section, and it will be obvious that by means of the nut the ends may be forced apart or drawn together to provide suitable tension for the runner.

In Figure 14 is shown a method of lubricating the runner or tread chain and the driving chain on both faces. In this arrangement, the supporting frame 63 is of usual construction, and supports the runner or tread chain 64 in the usual manner. This runner is driven by teeth 65 on a sprocket chain 66 which runs upon the wheels 67 secured to the shafts 68 and 68ᵃ. A suitable container 69 is provided for lubricant at the front end of the frame and near the top thereof, and this container has an outlet pipe 70 extending along its bottom and opening through the frame to a point where it will lubricate the rollers of the runner.

A pipe 71 extends upward from the inner end of the pipe 70, and a valve seat is arranged between this pipe 71 and the pipe 70. A valve 72 co-operates with the seat, and the pipe 71 has radial openings above the seat to permit the lubricant to flow into the pipe 71 and through the seat. A stem 73 is connected with the valve, and a spring 74 is arranged about the stem, between the pipe and a cap 75 secured to the upper end of the stem and mounted to slide in the pipe.

Rollers 76 are journaled in brackets 77 connected with the runner, and these brackets and rollers are arranged at regular intervals, and the rollers are adapted to contact with the cap, to open the valve at predetermined intervals, to permit a portion of the lubricant to flow to the runner. It will be noticed that the pipe 70 has branches delivering to the wheels, and to the journal pins, thus lubricating every part of the runner and the face of the track which it engages.

A stick of graphite 78 or the like is mounted to slide in a socket 79 arranged above the lower run of the chain 66, and the outer end of this stick is forced into contact with the inner face of the chain by means of a coil spring 80 which is arranged between the inner end and the bottom of the socket. Thus the inner face of the sprocket 10 and that part which engages the wheels 67 is lubricated. For lubricating the teeth 65, the shaft 81 is journaled in a supporting bracket 82 at the rear of the rearmost wheel 67. This shaft has pairs of radial arms 83, and in each pair of arms is journaled a roller 84 of graphite or like material. These rollers are adapted to engage between the teeth of the chain, as shown, and the arms are rotated by the engagement of the teeth with the rollers.

In Figures 15 and 16 is shown another embodiment of the invention, wherein the tracks 85 are of usual form, and the runner is composed of tread plates 86 carrying tread blocks 87. At each end of each tread plate there is a pair of depending lugs 88 and 89, respectively, and the wheels 90 are secured to a shaft 91 which extends through the lugs 89 and is journaled in both lugs 89 and 88. Ball bearings 92 are arranged between each lug and the shaft. It will be noticed that while the lugs 88 are integral with the plates, the lugs 89 are detachably connected therewith. The improved driving chain 93 has teeth 94 on its outer face, and these teeth engage bushings 95 on the shaft 91 between the lugs 89.

In Figures 17 and 18 is shown a cushioning construction. Here the driving wheel 96 is secured to the axle 97, which is journaled in the frame 98, consisting of inner and outer sections, ball bearings being provided for the shaft. This frame carries a casing 99 on each section, the casings being continuous hollow casings having at their peripheral surfaces the contour of the trackway desired. Each of these casings is open at its peripheral surface; that is, there is no fixed peripheral wall, the wall being supplied by a track plate 100. This track plate, which is shaped like the peripheral face of the rail shown in Figure 1, that is, grooved longitudinally, has inwardly extending side flanges, which fit the inner faces of the side walls of the casing. Cushions 101 of rubber or like resilient material, are arranged within the casings between the movable wall and the fixed bottom or inner wall of the casing. This cushion is continuous, and it will be evident that it will cushion the hub against the runner. The runner is composed of tread plates 102 having tread blocks 103, and having ribs 104 on the inner faces near their side edges. The rollers 105 are similar to those shown in Figure 1, and they are on the outer sides of the ribs. Housing rings 106 are secured to the outer walls of the casings 99 and adapted to bear against the outer side edges of the tread plates and the outer faces of the housings 107 corresponding to the housings 25 of Figure 4. It will be noted that the outer walls of the casings 99 are extended beyond the inner walls, in order that with the rings 106 they may house the rollers and the track.

Referring to Figure 18, it will be seen that the cushions 101 are concave at their opposite faces to provide additional resiliency, that is, these cushions do not entirely fill the casing, the concave faces of the cushions permitting expansion and contraction.

In Figure 19 a form of cushion is shown, the said cushion 108 being designed to fill the casing 99, but having transverse openings 109 to provide resiliency.

In Figures 20 and 21 is shown another embodiment of the invention. In this construction the frame 110 corresponding to the frame 98 of Figures 17 and 18 is sectional, each section carrying a casing 111 similar to the casings 99 of Figures 17 and 18. The track plate 112 is arranged in the same manner as the track plate 100, but instead of having a groove as in the construction of Figures 18 and 19, the said plate has a rib, and the tread plates 113 carry grooved wheels 114 which engage the ribs. These wheels are journaled in lugs 115 which extend inwardly from the track plates. The construction is otherwise similar to that of Figures 18 and 19, the driving wheel 116 being secured to the axle 117 which is journaled in ball bearings in the hub portions of the frame sections.

In Figures 22 to 24, inclusive, is shown a pneumatic construction. In this construction the frame 118 carries a continuous annular casing or chamber 119 which is open at its peripheral wall, the said peripheral wall being replaced by a track plate 120. This track plate is slidable between the side walls of the chamber, and a pneumatic shoe or casing 121 is arranged within the chamber. It will be noticed, referring especially to Figures 23 and 24, that this track plate 120 is ribbed on its outer face, the rib extending longitudinally of the track plate. The runner is composed of tread plates 122 and cushioning blocks 123, and the tread plates move upon annularly grooved rollers 124. These rollers are grooved to fit the rib 125 of the track plate, and the tread plates 122 have ribs 126 which also fit the grooves of the rollers. The pneumatic shoe has the usual filling valve 127. With this construction the shock and jar is absorbed by the pneumatic cushion.

In Figure 25 is shown an arrangement of anti-skid mechanism. In this construction the tread plates 128 have central openings through which are passed bolts 129. Each bolt carries a ring 130 which is connected to the head of the bolt by flexible members 131, chains in the present instance. The chains hold the ring in proper relation with respect to the bolts, and the rings and chain and the bolt head are an effective anti-skid device.

In Figure 26 the tread blocks 132 have the central openings for receiving bolts 133, and these bolts support a chain 134 which extends entirely around the runner.

The operation of all of the different embodiments is practically the same, and will be clear from the description of the construction. The runners or tread chains run upon the tracks, two track sections being provided for each runner. The runners are driven by the teeth of the sprocket chains in Figures 1, 3, 8, 14 and 15 and by the large wheels in Figures 13, 17, 20 and 22, and the sprocket chains or wheel as the case may be may be driven from the motor of the vehicle. In the construction of Figures 1–13–14 any suitable cushioning mechanism may be provided at the hub. In the remaining constructions the cushioning means is adjacent to the rim.

Referring to Figure 14, it will be seen that a pad 70ª of felt or the like is arranged on the supporting frame 63 just below the outlet pipe 70 of the lubricant container, for receiving the lubricant and insuring that it will be thoroughly applied to the wheels.

It will be understood that the device forming the subject matter of the present invention is designed to take the place of the motor truck wheels of usual construction. The construction shown in Figures 1 to 16 is designed for motor trucks; that shown in Figures 17 to 21 is designed for automobiles and light trucks; while that shown in Figures 22 to 24 is especially designed for aerial vehicles.

In Figure 13 it will be noticed that there is a shock absorbing mechanism provided in the form of a ring or washer 55ª of rubber or the like, which is arranged between the axle 58 and the hub 55 of the frame, to cushion and absorb shock and jar between the frame and the axle 58. The wheel 59 in Figure 13 is an ordinary traction wheel.

It will be understood that the improved runner is designed to take the place of motor vehicle wheels or to go over motor vehicle wheels for obtaining better traction, to prevent slipping and skidding. The weight, it will be observed, is centered on the rear half of the wheel, allowing the front portion to freely rise and fall with the level of the road, and it is especially designed to move heavy loads over bad roads. The improved runner will permit aeroplanes to land or to lift on soft uneven ground.

I claim:

1. A runner for motor vehicles comprising a supporting frame, rails carried thereby, supporting members for said rails made of rubber and having the sides thereof concaved, a flexible endless chain or runner movably mounted on the rails, and rollers interposed between the rails and runners.

2. A runner for motor vehicles comprising a supporting frame, rails carried thereby, supporting members for said rails made of rubber, a flexible endless chain or runner movably mounted on the rails, and rollers interposed between the rails and runners.

3. A runner for motor vehicles comprising a supporting frame, rails carried thereby forming a loop and being resiliently supported on the frame, a flexible endless chain or runner movably mounted on the rails for travel around the loop and rollers interposed between the rails and the runners.

4. A runner for motor vehicles comprising an endless chain type runner operatively supported on a grooved track, loose rollers between the track and the runner, and spacing blocks lying loosely between the rollers, said blocks being slidably supported in the groove of the track.

5. A runner for motor vehicles comprising an endless chain type runner operatively supported on a grooved track, loose rollers between the track and the runner, and spacing blocks lying loosely between the rollers, said blocks being slidably supported in the groove of the track, and having concave portions in contact with the rail.

6. A runner for a motor vehicle comprising a supporting frame with an endless chain of tread plates adapted to travel thereover, a driving wheel positioned within the frame in peripheral driving contact with the plates, and means to insure a resilient peripheral contact of the wheel with the plates.

7. In a vehicle, a frame, a pair of rails encircling said frame and secured thereto, an endless runner supported upon said rails and adapted to move thereon, resilient members for supporting said rails, an axle having its one end journaled in said frame, a wheel carried by said axle and the periphery of said wheel adapted to engage with said endless runner.

ELDIN M. PERRY.